United States Patent [19]

Gargas

[11] Patent Number: 4,555,337

[45] Date of Patent: Nov. 26, 1985

[54] PLUG AND FILTER ASSEMBLY FOR PAINT SPRAYER

[75] Inventor: Eugene F. Gargas, Wooster, Ohio

[73] Assignee: The Wooster Brush Company, Wooster, Ohio

[21] Appl. No.: 663,868

[22] Filed: Oct. 23, 1984

[51] Int. Cl.[4] .............................................. B01D 29/10
[52] U.S. Cl. .................................... 210/238; 210/445; 210/450; 210/453; 210/454
[58] Field of Search ................ 210/232, 238, 443–446, 210/450–454

[56] References Cited

U.S. PATENT DOCUMENTS

| 2,629,632 | 2/1953 | Munson | 210/454 X |
| 2,937,754 | 5/1960 | Kasten | 210/444 X |
| 3,363,762 | 1/1968 | Ensign | 210/454 X |
| 3,767,053 | 10/1973 | Bavin | 210/454 X |
| 3,909,414 | 9/1975 | Drath | 210/454 X |
| 4,028,254 | 6/1977 | Shufflebauger et al. | 210/452 X |
| 4,124,511 | 11/1978 | Lay | 210/454 X |
| 4,404,103 | 9/1983 | Drath | 210/451 X |
| 4,442,003 | 4/1984 | Holt | 210/451 X |

FOREIGN PATENT DOCUMENTS

| 121864 | 1/1919 | United Kingdom | 210/454 |
| 600820 | 4/1948 | United Kingdom | 210/453 |

Primary Examiner—Robert Spitzer
Attorney, Agent, or Firm—Renner, Otto, Boisselle & Lyon

[57] ABSTRACT

A plug and filter assembly for a paint sprayer is characterized by a hand turnable knob that is rotatably coupled to a sealing plug to reduce the torque needed to install or remove the assembly from a paint head by axially advancing the plug into or out of an O-ring seal without having to turn the plug in the O-ring. The rotatable coupling is effected by a fastener having a head and a cylindrical shank portion which is received in an oversized central axial bore in the knob. The cylindrical shank portion has a diameter greater than that of a threaded end portion of the fastener secured in the plug and thus defines a shoulder which engages an axial end face of the plug positively to fix the axial spacing between the fastener head and plug to a distance greater than the axial length of a portion of the knob axially trapped between the fastener head and plug for free nonbinding rotation of the knob. A filter screen is coaxially connected to the plug by a coil spring and inner and outer end caps for insertion and removal of the assembly as a unit.

21 Claims, 2 Drawing Figures

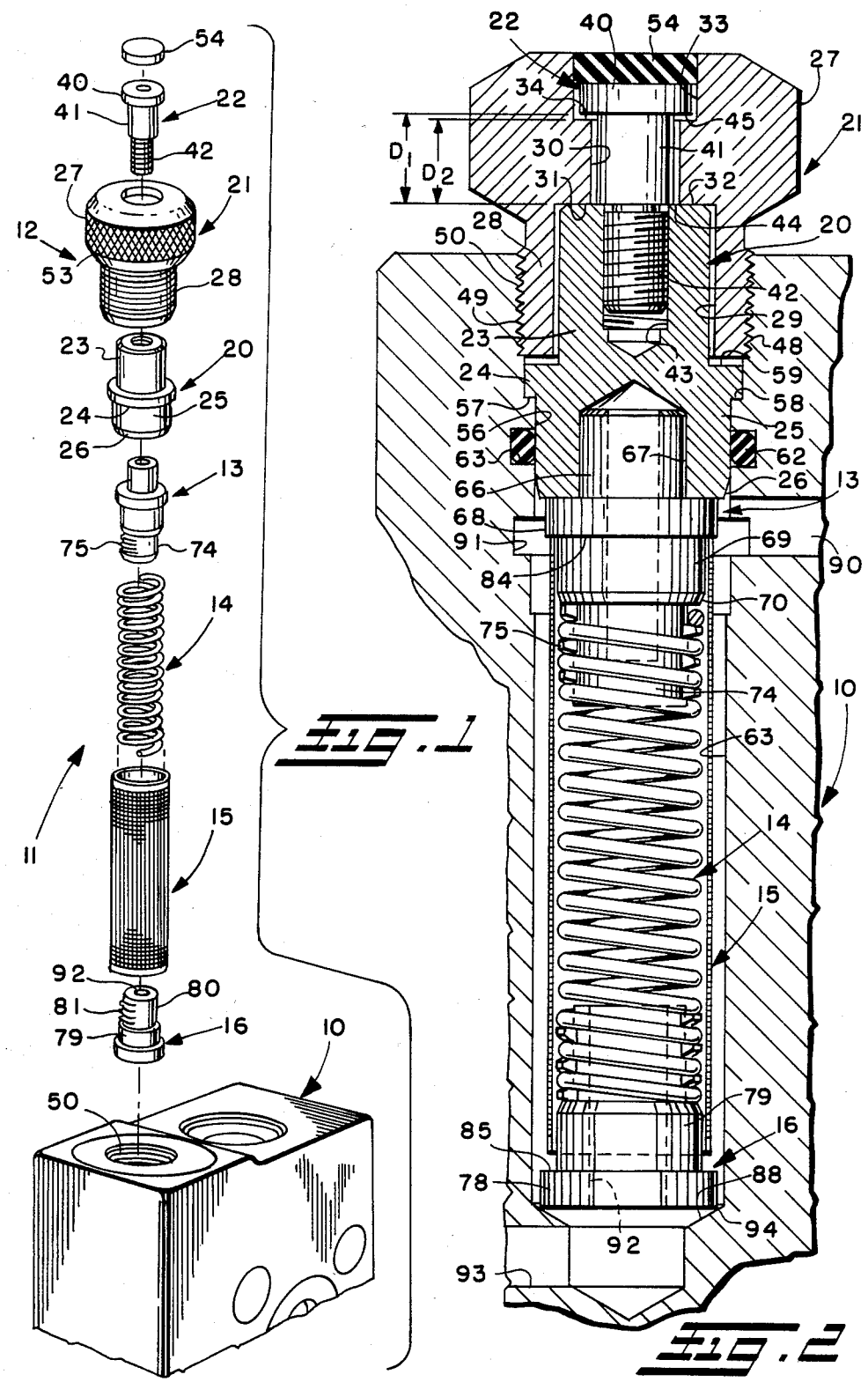

PLUG AND FILTER ASSEMBLY FOR PAINT SPRAYER

The invention herein disclosed relates generally to a plug assembly for closing a bore in a housing and, more particularly, to a plug and filter assembly having application in a paint sprayer or the like.

BACKGROUND

Paint sprayers heretofore have employed one or more filters to filter the paint to avoid clogging of the paint spray head. It is conventional practice to install a plug and filter assembly in a paint head or block ported for passage of paint through the filter screen of such assembly. Typically, the assembly is removable for cleaning or replacement of the filter screen.

One such plug and filter assembly previously utilized included a filter plug, a cylindrical filter screen, a coil filter spring and a filter end cap. The filter plug had a large hex head and a threaded shank portion for screwing into a correspondingly threaded bore in the paint head through which the filter screen could be inserted into a filter chamber in the paint head. The filter plug and filter end cap had similarly configured axial end portions for close telescopic fit in respective ends of the filter screen to close such ends. Also, such end portions of the filter plug and filter end cap each had a reduced diameter axial stub provided with diametrically opposed ribs threaded for screwing into the respective end of the coil filter spring. Accordingly, the filter spring served to hold filter end cap to the filter plug with the filter screen trapped therebetween. This permitted the assemblage of such components to be installed in or removed from the paint heads as a unit.

The plug and filter assembly was installed by screwing the filter plug into the threaded bore in the paint head with the filter screen extending into the larger diameter filter chamber. As the filter plug was tightened into place, the filter end cap would be biased by the filter spring against the axially inner end wall of the filter chamber. Opening to the filter chamber at such axially inner end wall was an outlet port which communicated with the interior of the filter screen through an axial bore or passage in the filter end cap. In addition to the outlet port, the paint head also had an inlet port communicating with the filter chamber exteriorly of the filter screen. Accordingly, paint entering the filter chamber at the inlet port would flow radially through the filter screen to the interior thereof for existing through the outlet port via the axial passage in the filter end cap.

To seal the paint head bore or outer axial end of the filter chamber so as to prevent leakage through the bore past the filter plug, an O-ring was provided and retained in the bore axially inwardly of the threaded portion thereof. As the plug was screwed into the bore, a cylindrical sealing surface thereof would be forced axially into the O-ring to compress the O-ring and effect a seal therewith. Because of the high operating pressures as on the order of 1,000–3,000 psi, relatively high O-ring compressive forces were necessary to effect an adequate seal.

One drawback of the above arrangement was that large torques were required to turn the filter plug in the O-ring during installation or removal of the assembly. As the plug was rotated properly to position axially the sealing surface of the plug in relation to the O-ring, the O-ring would grab or resist the turning and thus give rise to a brake-like action. Consequently, installation or removal of the assembly required the use of a wrench or the like to turn the filter plug, and this coupled with the required large torques made installation and removal of the assembly much more difficult and less convenient than desired.

SUMMARY OF THE INVENTION

The present invention overcomes the aforenoted drawback by providing a novel plug assembly or plug and filter assembly that can be removed without the use of a tool, i.e., by hand, and/or with minimal effort while still providing an effective sealed closure of a bore in a paint head, block or the like that can withstand high pressures such as on the order of 1,000–3,000 psi. According to the invention, required torque to install or remove the assembly is reduced by unique coupling of a free-turning knob to a sealing plug which is advanced axially into an annular seal such as an O-ring without having to be turned in the O-ring.

In accordance with the invention, a plug and filter assembly removably securable in a paint head or the like having a filter chamber and a bore for insertion and removal of the assembly, comprises: a sealing plug axially insertable into the paint head bore for sealing by an annular sealing element to the inside of the paint head bore; a cylindrical filter insertable into the paint head filter chamber; means securing the filter coaxially to the inner end of the sealing plug; a knob having a threaded portion for threaded engagement with a correspondingly threaded portion of the paint head; and fastener means rotatably coupling the sealing plug and knob for axial driving of the sealing plug without rotation into and out of engagement with the sealing element upon turning of the knob when in threaded engagement with the paint head.

Further in accordance with the invention, the fastener means includes a cylindrical shank portion extending through an oversized central axial bore in the knob, a head having a diameter greater than the central bore to provide an axially inner face cooperaive with an axially outer face of the plug to trap axially therebetween a portion of the knob, and a threaded end portion screwed into the plug, such threaded end portion having a diameter less than that of the cylindrical shank portion to form a shoulder which engages an axial end of the plug positively to fix the axial spacing between such inner and outer faces to a distance greater than the axial length of the trapped portion of the knob for free nonbinding rotation of the knob.

According to another aspect of the invention, a plug assembly for sealingly closing a bore in a housing comprises: a plug axially insertable into the housing bore for sealing by an annular sealing element to the inside of the housing bore; a knob having a threaded portion for threaded engagement with a correspondingly threaded portion of the housing, a head portion for turning of the knob, and an axially inner end face operative to bear against an axially outer end face of the plug axially to drive the plug into the housing bore for sealing thereof upon turning of the knob when in threaded engagement with the housing; and fastener means for rotatably coupling the knob to the plug, the fastener means including a shank extending axially through a larger diameter central axial bore in the knob and secured at the inner end thereof to the plug, a head having a diameter greater than that of the central bore to provide an axially inner end face operative to engage an axially outer end face of the knob, and spacer means for positively fixing the axial spacing between the inner end face of the head of the fastener means and outer end face of the plug to a distance greater than the axial spacing between the inner end face and outer end face of the knob for free turning movement of the knob relative to the plug.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principles of the invention may be employed.

BRIEF DESCRIPTION OF THE DRAWING

In the annexed drawing:

FIG. 1 is an exploded perspective view of a plug and filter assembly according to the invention; and FIG. 2 is a longitudinal (axial) sectional view through the assembled plug and filter assembly as installed in a paint head or the like.

DETAILED DESCRIPTION

By way of illustration of a preferred embodiment of the invention, FIG. 1 shows in exploded view a paint head 10 and the components of a plug and filter assembly generally at 11. The components of such assembly 11 include a plug assembly 12, an outer filter end cap 13, a coil filter spring 14, a cylindrical filter screen 5 and an inner filter end cap 16. The illustrated paint head is of conventional type and is simply exemplary of a paint head, block, housing or the like in which the plug assembly 12 may be installed to close a bore therein or, more particularly, in which the plug and filter assembly 11 may be installed to provide for filtering of fluids such as paint.

With additional reference to FIG. 2, the plug assembly 12 includes a sealing plug 20, a knob 21 and a fastener 22 which rotatably couples the knob 21 to the sealing plug 20 for relative free-turning movement. Going from top to bottom, the sealing plug 20 has a coupling end portion 23, an enlarged diameter shoulder portion 24, and a cylindrical sealing or seat portion 25 preferably terminating at a tapered, i.e., frusto-conical, guide surface 26. Again going from top to bottom, the knob 21 has a head portion 27 and a reduced diameter tubular skirt portion 28 forming an axially inwardly opening cylindrical socket 29 for receipt of the coupling end portion 23 of the sealing plug 20. Preferably there is a small radial clearance between the inner diameter of the skirt portion 28 and outer diameter of the coupling end portion 23 to permit limited relative pivoting and radial translation between the knob and sealing plug so as to facilitate free turning of the knob relative to the sealing plug and some misalignment therebetween when installed in the paint head 10.

The head portion 27 of the knob 21 centrally located therein an axial cylindrical bore 30. The inner end of the bore 30 is circumscribed by an annular inner face or shoulder 31 forming the base of the socket 29 which is operative to bear against an axially outer end face 32 of the coupling end portion 23 of the sealing plug 20. The outer end of the bore 30 terminates at a coaxial larger diameter bore or counterbore 33 which provides at the intersection of such bores 30 and 33 an outer annular face or shoulder 34.

The counterbore 33 is sized to accommodate the head 40 of the fastener 22 which further has a cylindrical spindle or shank portion 41 and a reduced diameter threaded end portion 42. The threaded end portion 42 is screwed into a correspondingly threaded axial bore 43 centrally located in the coupling end portion 23 of the sealing plug 20. At the intersection of the spindle portion 41 and threaded end portion 42, there is formed an annular stop shoulder 44 which engages the outer end face 32 of the coupling end portion 23 to fix the axial spacing, indicated at D1, between the outer end face 32 and an annular inner end face or shoulder 45 of the fastener head 40 formed at the intersection of the fastener head with the smaller diameter cylindrical shank portion 41. The shoulder 45 radially overlaps the outer shoulder 34 of the knob 21 thereby serving axially to trap or hold the knob on the cylindrical shank portion 41 of the fastener.

The spacing D1 is slightly greater than the axial spacing D2 between the inner shoulder 31 and outer shoulder 34 of the knob 21 to provide axial clearance between the central axial portion of the knob defined between such shoulders and the fastener head 40 and sealing plug 20. Also, the knob bore 30 has a diameter somewhat greater than that of the cylindrical shank portion 41 extending therethrough to provide radial clearance therebetween. Accordingly, the knob 21 can be freely rotated on the cylindrical shank portion 41 of the fastener 22 while being held axially trapped on such cylindrical shank portion between the fastener head 40 and the coupling end portion 23 of the sealing plug 20.

As will be appreciated, the just described rotatable coupling between the knob 21 and sealing plug 20 allows the knob to be screwed at its skirt portion 28, externally threaded at 48, into a correspondingly threaded axially outer end portion 49 of a bore 50 in the paint head 10 without the plug having to be rotated therewith. Also, limited play between the knob and plug is provided by the above indicated clearances. The resultant advantages are discussed hereinafter.

It is noted that the knob head 27 preferably may have a knurled outer diameter surface, as seen at 53 in FIG. 1, or otherwise may be suitably configured to facilitate hand (finger) turning of the knob 21. If desired, the knob head alternatively may be hex shape or otherwise adapted for optional turning by a tool such as a wrench, pliers, etc., although a tool normally will not be needed to screw the knob into the paint head 10 as discussed further below. If desired, a decorative cap or plug 54 may be secured in the outer end of the counterbore 33 to close the same and hide the head 40 of the fastener 22 from view.

Continuing with the description of the sealing plug 20, the annular shoulder portion 24 thereof can be seen to have an outer diameter less than the inner diameter of the outer threaded end portion 49 of the bore 50 but greater than the reduced diameter inner end portion 56 of the bore which is sized to receive the cylindrical sealing portion 25 of the plug desirably with a relatively close fit but not so close as to interfere with axial insertion of the sealing portion in the inner end portion of the bore. The annular shoulder portion 24 forms at its intersection with the sealing portion an annular stop shoulder 57 for engaging an axially opposed annular shoulder 58 formed at the intersection of the inner and outer end portions of the bore. Such engagement provides a positive mechanical stop limiting the extent of insertion of the plug into the bore upon screwing of the knob 21 into the threaded end of such bore. As seen at 59, axial clearance is provided between the inner end of the knob skirt portion 28 and the annular shoulder portion 24 of the plug to permit the above noted limited relative pivoting between the knob and sealing plug as well as free rotation of the knob relative to the plug.

When the annular shoulder portion 24 is axially butted against the annular shoulder 58 of the paint head bore 50, the cylindrical sealing portion 25 of the plug 20 is axially coextensive with an annular gasket such as the O-ring 62 which is retained in an annular groove 63 concentric with the inner end portion 56 of the bore 50. The O-ring or gasket has a size selected to provide a radial compression seal sufficient to withstand operational pressures in the filter chamber 63 formed as a continuation of the bore 50, or vice versa. As previously indicated, the cylindrical sealing portion terminates at a tapered guide surface 26 which serves to guide the plug into the inner end portion 56 of the bore during installation of the assembly in the paint head.

The outer filter cap 13 is coaxially secured to the sealing plug 20 by a shank end portion 66 press fitted into a central axial bore 67 in the cylindrical sealing portion 25 of the sealing plug. Also, the outer filter end cap has an annular flange portion 68 which butts against the axially inner end of the plug 20 and a reduced diameter filter insert portion 69. The filter insert portion 69 has a diameter slightly less than the inner diameter of the cylindrical filter screen 15 for telescopic insertion into the outer end of the filter screen as shown. The inner end of the insert portion 69 may be tapered as seen at 70 to facilitate insertion of the insert portion into the end of the filter screen.

The outer filter end cap 13 also includes an axial stub 74 at the inner end 70 of the insert portion 69 having a diameter approximately equal the inner diameter of the turns of the coil filter spring 14. The stub 74 is provided with diametrically opposed ribs 75 threaded for screwing into the outer end of the filter spring to effect attachment of the filter spring to the outer filter end cap.

The inner filter end cap 16 is substantially similar to the outer filter end cap 13 except for the absence of a press-fitted shank. Thus, the inner filter end plug 16 has an annular flange portion 78, a reduced diameter filter insert portion 79, and a still further reduced stub portion 80 provided with ribs 81 threaded for screwing into the inner end of the filter spring 14. After the filter spring has been screwed onto the outer filter end cap stub 74 and the filter screen 15 slipped over the spring and the insert portion 69 of the outer filter end cap, the inner filter end cap may then be screwed into the inner end of the filter spring with its filter insert portion 79 being telescopically received in the inner end of the filter screen.

At the intersections of the annular flange portions 68 and 78 and respective insert portions 69 and 79 of the outer and inner filter end caps 13 and 16, respective annular shoulders 84 and 85 are formed which axially trap the filter screen 15 therebetween. The axial spacing between such shoulders 84 and 85 should be greater than the axial length of the filter screen when the filter spring 14 is uncompressed to permit a range of axial movement of the inner filter end cap 16 against the developed biasing force of the filter spring upon installation of the overall assembly 11 in the paint head 10.

Installation of the plug and filter assembly 11 is effected by first assembling the components thereof in the manner illustrated. The knob 21 then may be grasped to insert the filter screen end of the assembly through the paint head bore 50 and into the filter chamber 63 until the threaded skirt portion 28 of the knob engages the threaded end 49 of the bore 50. At this point, the knob may be finger turned to screw the knob into the bore thereby axially to advance the sealing plug 20 and filter screen 15 into place.

The assembly 11 preferably is axially dimensioned such that the screwing of the knob 21 into the bore 50 will be commenced prior to axial entry of the sealing portion 25 of the plug 20 into the O-ring 62. Prior to such entry, the plug may and most likely will turn with the knob. Once the sealing portion of the plug is axially advanced into the O-ring, the O-ring will compress and frictionally grap the plug to resist turning thereof. The knob, however, may continue to be turned, but without having to impart thereto the large torques otherwise required to turn the plug in the O-ring if the knob was not free to turn relative to the plug. That is, the installation torque is less because turning the knob axially advances the plug into the O-ring without turning the plug in the O-ring.

The knob 21 is turned until the annular shoulder portion 24 of the sealing plug 20 engages the bore shoulder 58 whereupon the plug 20 will be in proper position in the bore 50. As the sealing plug 20 moves axially into proper position, the inner filter end cap 16 will engage and be biased, by compression of the filter spring 14, against the inner axial end wall 88 of the filter chamber 63.

In use, paint or other fluid may be introduced under pressure, as on the order of 1,000 to 3,000 psi, in the filter chamber 63 exteriorly of the filter screen 15 through an inlet pot 90 opening to the outer diameter of the filter chamber at an annular groove 91 proximate the outer end of the filter screen. The paint will flow around and axially along the filter screen for radial passage through the mesh of the screen into the interior of the screen. The paint then will pass axially inwardly through the interior of the screen and an axial bore or passage 92 in the inner filter end cap 16 for exiting through an outlet port 93. The outlet port 93 opens to the filter chamber at the axial end wall 88 internally of the annular closure effected at 94 between the inner filter end cap 16 and the chamber end wall 88.

When desired, as for cleaning or replacement of the filter screen 15, the plug and filter assembly 11 may be removed from the paint head 10 by unscrewing the knob 21 to permit axial withdrawal of the assembly. As will be appreciated, again large torques will not be required by reason of the unique rotatable coupling between the knob and sealing plug 20.

It also is noted that the provided clearances between the knob 21 and sealing plug 20 will allow some misalignment between such components without binding thereof when installed in the paint head 10. Such misalignment may result, for example, from the inner and outer portions of the bore 50 being slightly radially off center with respect to one another or having their axes at a slight cant to one another.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the following claims.

I claim:

1. A plug and filter assembly removably securable in a paint head or the like having a filter chamber and a bore for insertion and removal of the assembly, said assembly comprising:
   a sealing plug axially insertable into the paint head bore for sealing by an annular element to the inside of the paint head bore;
   a cylindrical filter insertable into the paint head filter chamber;
   means securing said filter coaxially to the inner end of said sealing plug;
   a knob having a threaded portion for threaded engagement with a correspondingly threaded portion of the paint head and a head portion for turning of said knob; and
   fastener means rotatably coupling said sealing plug and knob for axially driving of said sealing plug without rotation into and out of engagement with the sealing element upon turning of said knob when in threaded engagement with the paint head.

2. An assembly as set forth in claim 1, wherein said fastener means includes a cylindrical shank portion extending through an oversized central axial bore in said knob, a head having a diameter greater than the central bore to provide an axially inner end face cooperative with an axially outer face of said knob to trap axially therebetween a portion of said knob, and a threaded end portion screwed into said plug, said threaded end portion having a diameter less than that of said cylindrical shank portion to form a shoulder which engages an axial end of said plug positively to fix the axial spacing between such inner and outer faces to a distance greater than the axial length of the trapped portion of said knob for free nonbinding rotation of said knob.

3. An assembly as set forth in claim 1, wherein said sealing plug has a cylindrical portion movable into the sealing element to compress the sealing element radially between said plug and the paint head.

4. An assembly as set forth in claim 1, wherein said threaded portion of said knob is in the form of an annular skirt extending coaxially inwardly from said head portion of said knob to define a socket for receiving an axially outer portion of said plug.

5. An assembly as set forth in claim 4, wherein said skirt is threaded at its outer diameter for threaded engagement with a correspondingly threaded portion of the paint head.

6. An assembly as set forth in claim 5, wherein there is radial clearance between said skirt and outer portion of said plug to accommodate misalignment between said knob and plug when respectively secured and sealed in the paint head.

7. An assembly as set forth in claim 1, wherein said means securing said filter includes a pair of filter end caps telescopically fitted in respective ends of said filter, one filter end cap being secured to said plug and to the other filter end cap by a coil spring.

8. In a housing having a bore, a plug assembly for sealingly closing the housing bore comprising:
   a plug axially insertable into the housing bore for sealing by an annular sealing element to the inside of the housing bore;
   a knob having a threaded portion for threaded engagement with a correspondingly threaded portion of the housing, a head portion for turning of said knob, and an axially inner end face operative to bear against an axially outer end face of said plug axially to drive said plug into the housing for sealing thereof upon turning of said knob when in threaded engagement with the housing; aid
   fastener means for rotatably coupling said knob to said plug, said fastener means including a shank extending axially through a larger diameter central axial bore in said knob and secured at the inner end thereof to said plug, a head having a diameter greater than that of said central bore to provide an axially inner end face operative to engage an axially outer end face of said knob, and spacer means for positively fixing the axial spacing between said inner end face of said head of said fastener means and outer end face of said plug to a distance greater than the axial spacing between said inner end face and outer end face of said knob for free turning movment of said knob relative to said plug.

9. A combination as set forth in claim 8, wherein the inner end of said shank of said fastener means is threaded into a correspondingly threaded bore in said plug to secure the same, and said spacer means includes a larger diameter axial section of said shank forming at its intersection with the threaded inner end of said shank a shoulder operative to engage the outer end face of said plug to fix positively the axial spacing between the head of said fastener means and said plug upon securing of said fastener means to said plug.

10. A combination as set forth in claim 9, wherein said axial section of said shank of said fastener means is cylindrical and serves as a spindle on which said knob rotates at the central bore thereof.

11. A combination as set forth in claim 10, wherein said axial section extends between said inner end of said shank and said head of said fastener means and defines at its intersection with the latter said axially inner end face of said head.

12. A combination as set forth in claim 8, wherein said threaded portion of said knob is in the form of an annular skirt extending coaxially inwardly from said head portion of said knob to define a socket for receiving an axially outer portion of said plug.

13. A combination as set forth in claim 12, wherein said skirt is threaded at its outer diameter for threaded engagement with a correspondingly threaded outer portion of the housing bore.

14. A combination as set forth in claim 13, wherein there is radial clearance between said skirt and outer portion of said plug to accommodate misalignment between said knob and plug when respectively secured and sealed in the housing bore.

15. A combination as set forth in claim 8, wherein said central bore in said knob is counterbored at its axially outer end to receive therein the head of said fastener means.

16. A combination as set forth in claim 15, further comprising cap means received in the outer end of the counterbore in said knob to close the same.

17. A combination as set forth in claim 8, wherein said sealing element is axially retained in an annular recessed groove concentric with the housing bore, and said plug has a cylindrical portion movable into the sealing element to compress the sealing element radially between said plug and housing.

18. A combination as set forth in claim 17, wherein said plug and the housing bore have diametrically stepped portions cooperative positively to limit the extent of axial insertion of said plug into the housing bore.

19. A combination as set forth in claim 8, further comprising a filter chamber coaxial with said housing bore, said plug assembly including a cylindrical filter, and means securing said filter to said plug.

20. A combination as set forth in claim 19, wherein said means securing includes a spring extending axially within said filter and secured at one end to said plug and at its other end to an inner end cap holding said filter axially trapped between such inner end cap and plug.

21. In a housing having a bore, a plug assembly for sealingly closing the housing bore comprising:

a plug adapted to be sealed by an annular sealing element to the inner diameter of the housing bore;

a knob for axially driving said plug in the housing bore, said knob having an axially extending threaded portion for threaded engagement with a correspondingly threaded axial portion of the housing, and a head portion for turning of said knob to effect such threaded engagement and axial driving of said plug; and fastener means for rotatably coupling said knob to said plug, said fastener means including a shank extending through a larger diameter central axial bore in said knob and secured at a distal end thereof to said plug, a head having a diameter greater than said central bore to provide an axially inner face cooperative with an axially outer face of said knob to trap axially therebetween a portion of said knob, and spacer means for positively fixing the axial spacing between said inner and outer faces to a distance greater than the axial length of said trapped portion of said knob.

* * * * *